T. BROWN.
VEHICLE.
APPLICATION FILED JUNE 6, 1906.
1,099,233.
Patented June 9, 1914.
Fig. 1.
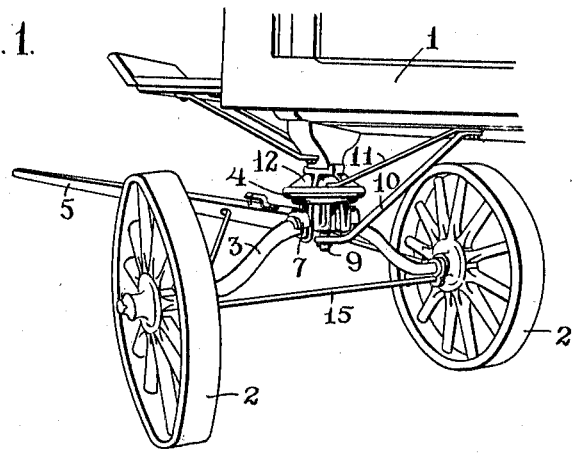
Fig. 2.
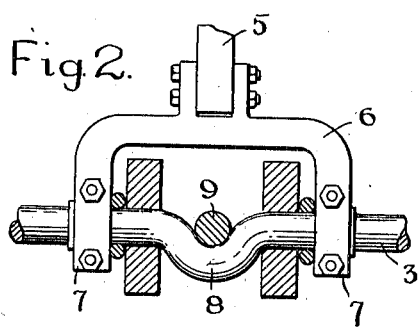
Fig. 3.
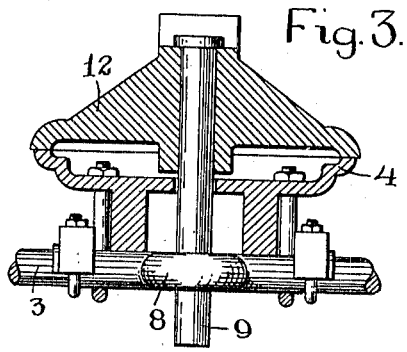
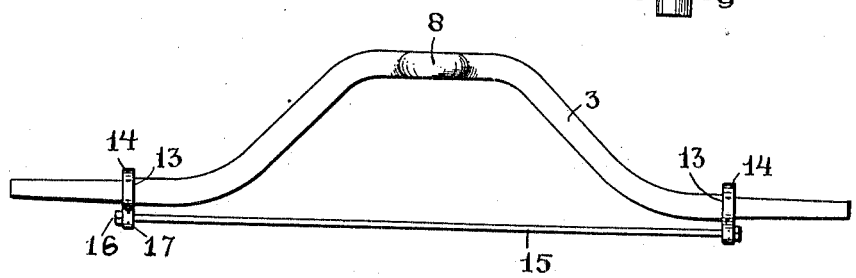
Fig. 4.
Witnesses
Roy D. Tolman.
Penelope Comberbach.
Inventor
Theophilus Brown.
By Rufus B. Fowler
Attorney

UNITED STATES PATENT OFFICE.

THEOPHILUS BROWN, OF WORCESTER, MASSACHUSETTS, ASSIGNOR TO RICHARDSON MANUFACTURING COMPANY, OF WORCESTER, MASSACHUSETTS, A CORPORATION OF MASSACHUSETTS.

VEHICLE.

1,099,233.  Specification of Letters Patent.  Patented June 9, 1914.

Application filed June 6, 1906. Serial No. 320,434.

*To all whom it may concern:*

Be it known that I, THEOPHILUS BROWN, a citizen of the United States, residing at Worcester, in the county of Worcester and Commonwealth of Massachusetts, have invented a new and useful Improvement in Vehicles, of which the following is a specification accompanied by drawings, forming a part of the same, in which—

Figure 1 is a perspective view of the forward wheels and axle, and so much of the vehicle body as is necessary to illustrate my invention. Fig. 2 is a detached plan view of the central portion of the forward axle. Fig. 3 is a detached rear view of the central portion of the forward axle with the turntable or "fifth wheel" in vertical sectional view. Fig. 4 is a detached rear view of the forward axle.

Similar reference characters refer to similar parts in the different views.

My invention relates to an improved construction of the forward axle of a vehicle, and an improved method of applying the force exerted in drawing the vehicle from the forward axle to the body portion, and it consists in the construction and arrangement of parts as hereinafter described and pointed out in the annexed claims.

Referring to the accompanying drawings 1 denotes the body of the vehicle supported on forward wheels 2 and rear wheels, not shown. The forward wheels 2 are carried upon a metal axle 3 which is bent upwardly between the wheels in the well known manner, and supports the forward end of the body by the usual turntable or "fifth wheel" 4. The pole 5 of the vehicle is attached to the axle 3 by a fork 6, bolted to the axle 3 in the usual manner on either side of the turntable 4. Between the ends 7 of the fork 6 and below the turntable 4 the axle 3 is given a semicircular bend 8 which extends rearwardly in the same plane as the axle 3. This semicircular bend 8 is arranged to receive the king bolt 9 attached to the body 1 of the vehicle. The king bolt 9 is increased in length and fits the inner side of the semicircular bend 8 of the axle 3. Any pulling strain applied to the axle 3 from the pole 5 is therefore communicated directly to the king bolt 9 from the axle 3 and hence to the vehicle body 1, and the various parts of the turntable 4 are relieved from all strains incident to the forward motion of the vehicle. In this way I obtain a strong construction throughout all the parts subjected to the strain of moving the vehicle, thereby freeing the necessarily weaker turntable from the most severe strains which would ordinarily come upon it. This also places the center of the king bolt in the vertical plane of the axis of the axle, which, as the axle is the direct connection between the forward wheels, is also the axial line of the forward wheels. This allows the location of the turntable or support for the wagon body, through the center of which the king bolt passes, directly above the axle and in a position to exert a direct downward thrust upon it. I also provide a brace rod 10 attached to the body portion 1 and encircling the king bolt 9 below the semicircular bend 8, thus providing a connection between the lower end of the king bolt 9 and the body of the vehicle, causing the pulling strain to be applied to both the lower and the upper end of the king bolt. Another brace rod 11 is preferably provided between the body 1 and the upper plate 12 of the turntable, arranged to assist in transmitting the pulling strain to the body.

The central section of the axle 3 is upwardly curved and is provided with shoulders 13, Fig. 4, immediately inside the forward wheels. Collars 14 are fitted on the ends of the axle 3 to contact with the shoulders 13 and a truss rod 15 connects the collars 14. The truss rod 15 resists any downward pressure on the curved section of the axle which tends to extend the axle longitudinally and insures the permanence of the upward bend in the axle 3.

The tensile strain upon the rod 15 is received by the nuts 16 held on the ends of the rod, or in lieu of two nuts, one end of the rod may be provided with a head and a nut used on the opposite end. The ends of the truss rod are loosely held in ears 17 extending downwardly from the collar 14 so the resistance to a tensile strain is applied close to the axle. The truss being located below the axle is easily accessible and can be readily removed endwise by the removal of a nut from the end. The nuts 16 can also be conveniently adjusted to receive the tensile strain when a load is applied to the axle.

I claim,

1. In a vehicle, a forward axle comprising a rod or bar bent upwardly at its central section, a bolster detachably attached to the crown of the axle, and means for applying the draft directly to the crown of the axle, a king bolt carried by the bolster in the plane of the axle and extending below the axle, said axle having a short bend at the king bolt substantially fitting the side of the king bolt.

2. In a vehicle, a front axle consisting of a rod or bar bent upwardly at its central section, a bolster resting upon the crown of the axle, means for applying the draft to the crown of the axle upon opposite sides of and contiguous to its center, and a king bolt carried by the bolster in the plane of the axle, said axle being bent rearwardly at the center of its crown to embrace and contact with the king bolt.

3. In a vehicle, a forward axle bent rearwardly at its center, a bolster carried upon the central portion of the axle, means for applying the draft to the axle upon opposite sides of its center, a king bolt carried by the bolster and extending through and beyond the concavity formed by the said rearwardly bent central portion of the axle, and a brace for the lower end of the king bolt.

Dated this 31st day of May 1906.

THEOPHILUS BROWN.

Witnesses:
RUFUS B. FOWLER,
PENELOPE COMBERBACH.

---

Copies of this patent may be obtained for five cents each, by addressing the "Commissioner of Patents, Washington, D. C."